US009909428B2

(12) United States Patent
Kottilingam et al.

(10) Patent No.: US 9,909,428 B2
(45) Date of Patent: Mar. 6, 2018

(54) TURBINE BUCKETS WITH HIGH HOT HARDNESS SHROUD-CUTTING DEPOSITS

(71) Applicant: General Electric Company, Schenectady, NY (US)

(72) Inventors: Srikanth Chandrudu Kottilingam, Simpsonville, SC (US); Surinder Singh Pabla, Greer, SC (US); Brian Lee Tollison, Honea Path, SC (US)

(73) Assignee: General Electric Company, Schenectady, NY (US)

( * ) Notice: Subject to any disclaimer, the term of this patent is extended or adjusted under 35 U.S.C. 154(b) by 733 days.

(21) Appl. No.: 14/090,871

(22) Filed: Nov. 26, 2013

(65) Prior Publication Data
US 2015/0147185 A1 May 28, 2015

(51) Int. Cl.
*F01D 5/14* (2006.01)
*F01D 5/20* (2006.01)
*B23K 35/32* (2006.01)
*F01D 5/28* (2006.01)
*F01D 11/12* (2006.01)
(Continued)

(52) U.S. Cl.
CPC .............. *F01D 5/20* (2013.01); *B22F 3/1055* (2013.01); *B22F 5/04* (2013.01); *B23K 26/0622* (2015.10); *B23K 26/342* (2015.10); *B23K 35/327* (2013.01); *B29C 64/153* (2017.08); *C23C 28/30* (2013.01); *F01D 5/28* (2013.01); *F01D 5/288* (2013.01); *F01D 11/12* (2013.01); *B23K 2201/001* (2013.01); *B23K 2201/34* (2013.01); *B23K 2203/08* (2013.01); *B23K 2203/16* (2013.01); *B23K 2203/26* (2015.10); *C22C 32/0047* (2013.01); *C22C 32/0057* (2013.01); *F05D 2300/175* (2013.01); *F05D 2300/226* (2013.01); *F05D 2300/2282* (2013.01); *F05D 2300/506* (2013.01); *Y02P 10/295* (2015.11); *Y10T 29/49337* (2015.01)

(58) Field of Classification Search
CPC ........................................................ F01D 5/20
USPC ....................................................... 415/173.1
See application file for complete search history.

(56) References Cited

U.S. PATENT DOCUMENTS 4,148,494 A    4/1979   Zelahy et al.
4,169,020 A    9/1979   Stalker et al.
(Continued)

FOREIGN PATENT DOCUMENTS

CN      1776025 A    5/2006
CN    102052094 A    5/2011
(Continued)

OTHER PUBLICATIONS

Wikipedia, Boron Nitride, https://en.wikipedia.org/wiki/Boron_nitride#Cubic_form_.28c ⫬ BN.29.*
(Continued)

*Primary Examiner* — Jason Fountain
(74) *Attorney, Agent, or Firm* — Ernest G. Cusick; Frank A. Landgraff

(57) ABSTRACT

Turbine buckets include a pressure side, a suction side opposite the pressure side, and a bucket squealer tip attached to the pressure side and the suction side. The bucket squealer tip includes a plurality of high hot hardness shroud-cutting deposits deposited on its exterior surface that have a hardness of at least about 1100 kg mm$^{-2}$ and a melting temperature of at least about 1500° C.

15 Claims, 4 Drawing Sheets

(51) Int. Cl.
  *B23K 26/342* (2014.01)
  *B23K 26/0622* (2014.01)
  *C23C 28/00* (2006.01)
  *B22F 3/105* (2006.01)
  *B22F 5/04* (2006.01)
  *B29C 64/153* (2017.01)
  *B23K 101/00* (2006.01)
  *B23K 103/08* (2006.01)
  *B23K 101/34* (2006.01)
  *B23K 103/16* (2006.01)
  *B23K 103/18* (2006.01)
  *C22C 32/00* (2006.01)

(56) References Cited

U.S. PATENT DOCUMENTS

| | | | |
|---|---|---|---|
| 4,232,995 A | 11/1980 | Stalker et al. | |
| 4,802,828 A | 2/1989 | Rutz et al. | |
| 5,076,897 A | 12/1991 | Wride et al. | |
| 5,389,228 A | 2/1995 | Long et al. | |
| 5,476,363 A | 12/1995 | Freling et al. | |
| 5,603,603 A | 2/1997 | Benoit et al. | |
| 5,997,248 A * | 12/1999 | Ghasripoor | F01D 11/12 415/173.4 |
| 6,190,124 B1 | 2/2001 | Freling et al. | |
| 6,316,078 B1 * | 11/2001 | Smialek | C23C 4/02 427/248.1 |
| 7,063,250 B2 * | 6/2006 | Ohara | B23K 1/0018 205/109 |
| 7,435,049 B2 | 10/2008 | Ghasripoor et al. | |
| 7,510,370 B2 * | 3/2009 | Strangman | C23C 26/02 415/173.4 |
| 8,157,504 B2 * | 4/2012 | Amaral | F01D 5/20 415/115 |
| 8,371,817 B2 | 2/2013 | Mukira et al. | |
| 8,517,688 B2 | 8/2013 | Joshi et al. | |
| 8,647,073 B2 * | 2/2014 | Hoebel | B23K 35/304 415/173.4 |
| 8,904,635 B2 * | 12/2014 | Berkebile | B23K 1/0056 219/121.61 |
| 2001/0014403 A1 | 8/2001 | Brown et al. | |
| 2003/0183529 A1 | 10/2003 | Ohara et al. | |
| 2004/0124231 A1 | 7/2004 | Hasz et al. | |
| 2010/0247323 A1 | 9/2010 | Persky et al. | |
| 2011/0103967 A1 | 5/2011 | Hoebel et al. | |
| 2011/0103968 A1 | 5/2011 | Hoebel et al. | |
| 2011/0164963 A1 | 7/2011 | Taylor | |
| 2012/0110847 A1 | 5/2012 | Berkebile et al. | |
| 2012/0192499 A1 | 8/2012 | Sung | |

FOREIGN PATENT DOCUMENTS

| | | | |
|---|---|---|---|
| EP | 1391537 A1 | 2/2004 | |
| EP | 1734146 A1 | 12/2006 | |
| EP | 2396157 A2 | 12/2011 | |
| EP | 1967699 B1 | 4/2012 | |
| EP | 2537959 A1 * | 12/2012 | C23C 28/42 |
| GB | 2449862 A | 12/2008 | |

OTHER PUBLICATIONS

Australian Government: Department of the Environment and Energy, Boron and compounds, http://www.npi.gov.au/resource/boron-and-compounds.*

European Search Report and Opinion issued in connection with corresponding EP Application No. 14192714.5 dated Mar. 26, 2015.

Second Office Action and Supplementary Search issued in connection with corresponding CN Application No. 201410703382.4 dated Oct. 23, 2017.

* cited by examiner

TURBINE BUCKETS WITH HIGH HOT HARDNESS SHROUD-CUTTING DEPOSITS

BACKGROUND OF THE INVENTION

The subject matter disclosed herein relates to turbine buckets and, more specifically, to turbine buckets with high hot hardness shroud-cutting deposits.

In a gas turbine engine, air is pressurized in a compressor and mixed with fuel in a combustor for generating hot combustion gases. Energy is extracted from the gases in a high pressure turbine (HPT), which powers the compressor, and in a low pressure turbine (LPT), which powers an external shaft for marine and industrial applications, or powers a fan in a turbofan aircraft engine application.

One factor relevant to the efficiency of the gas turbine engine is the sealing arrangements between rotating and stationary components. For example, seals may be provided between the various stages of rotating components, such as turbine buckets, and corresponding stationary structures, such as housings or shrouds within which the rotating components turn. The efficiency and performance of gas and steam turbines may be affected by clearances between bucket squealer tip (e.g., blade tips or tip caps) and the stationary shrouds. Generally, the closer the stationary component surrounds the tips of the rotating component(s), the greater is the efficiency of the turbomachinery.

However, the clearance dimensions between the turbine bucket squealer tip and the shroud may vary during various operating modes of the turbine engine. One reason for this is the dissimilar thermal growth within the engine between the bucket squealer tips of the turbine bucket and the shroud surrounding them. In such a case, the high temperature of the working fluid may cause a thermal discrepancy between the shroud and the rotor blades, wherein the shroud is at a lower temperature than the turbine buckets. The time interval until the thermal equivalence between the shroud and the turbine buckets is restored may be referred to as the transient period. Furthermore, the clearance between the shroud and the turbine buckets can decrease during this transient period as the components reach their steady state conditions and dimensions and cause the interfacing surfaces to rub.

Seals on the stationary shroud surface can include a material designed to be wearable or abradable with respect to the turbine buckets rubbing against them. In such a system, during the transient period, the bucket squealer tip contacts or rubs against the shroud, causing the shroud material to abrade or flake off. This may reduce wear to the rotating elements and provide reduced clearances (thereby increasing sealing) compared to a non-abradable system. However, these sealing systems may still subject turbine buckets to various rubbing forces that may affect the original material on its bucket squealer tip.

Accordingly, alternative turbine buckets would be welcome in the art.

BRIEF DESCRIPTION OF THE INVENTION

In one embodiment, a turbine bucket is disclosed. The turbine bucket includes a pressure side, a suction side opposite the pressure side, and a bucket squealer tip attached to the pressure side and the suction side. The bucket squealer tip includes a plurality of high hot hardness shroud-cutting deposits deposited on its exterior surface that have a hardness of at least about 1100 kg mm$^{-2}$ and a melting temperature of at least about 1500° C.

In another embodiment, a method is disclosed for modifying a turbine bucket. The turbine bucket has a pressure side opposite a suction side and a bucket squealer tip attached to the pressure side and the suction side. The method includes depositing a plurality of high hot hardness shroud-cutting deposits on an exterior surface of the bucket squealer tip, wherein the plurality of high hot hardness shroud-cutting deposits have a hardness of at least about 1100 kg mm$^{-2}$ and a melting temperature of at least about 1500° C.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
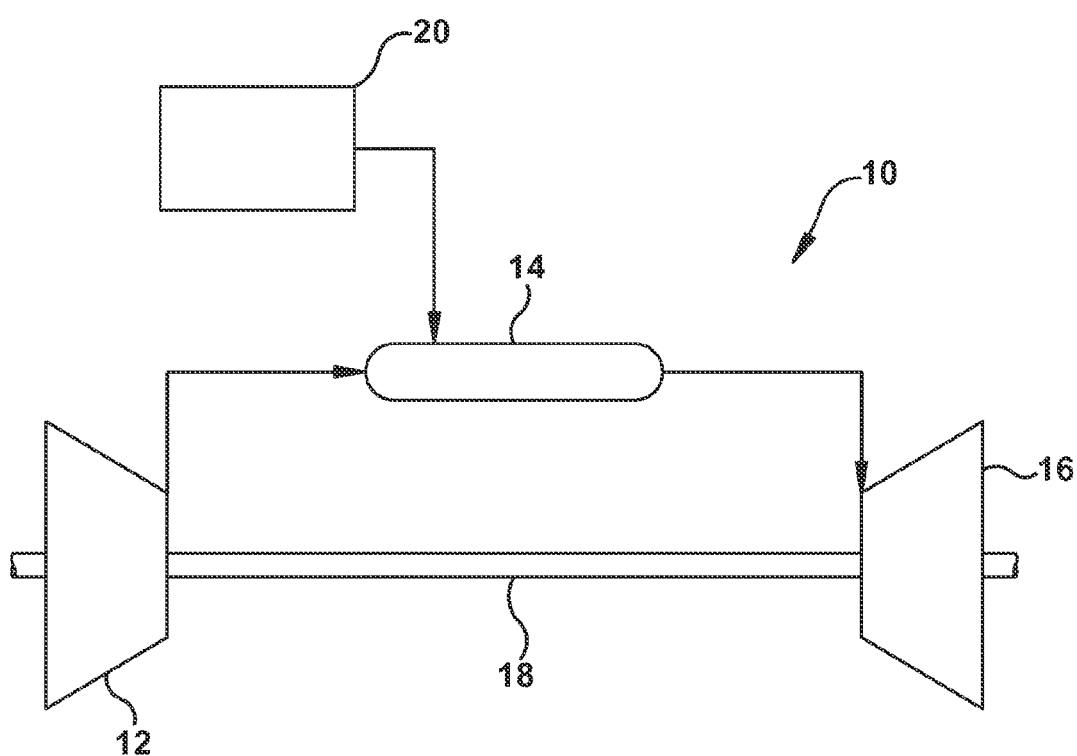
FIG. 1 is a schematic illustration of a gas turbine system according to one or more embodiments shown or described herein.

Referring to FIG. 1, a diagram of a gas turbine system 10 is illustrated. The gas turbine system 10 may include one or more compressors 12, combustors 14, turbines 1, and fuel nozzles 20. The compressor 12 and turbine 16 may be coupled by one or more shafts(s) 18. The shaft 18 may be a single shaft or multiple shaft segments couple together to form shaft 18.

Figure 2:
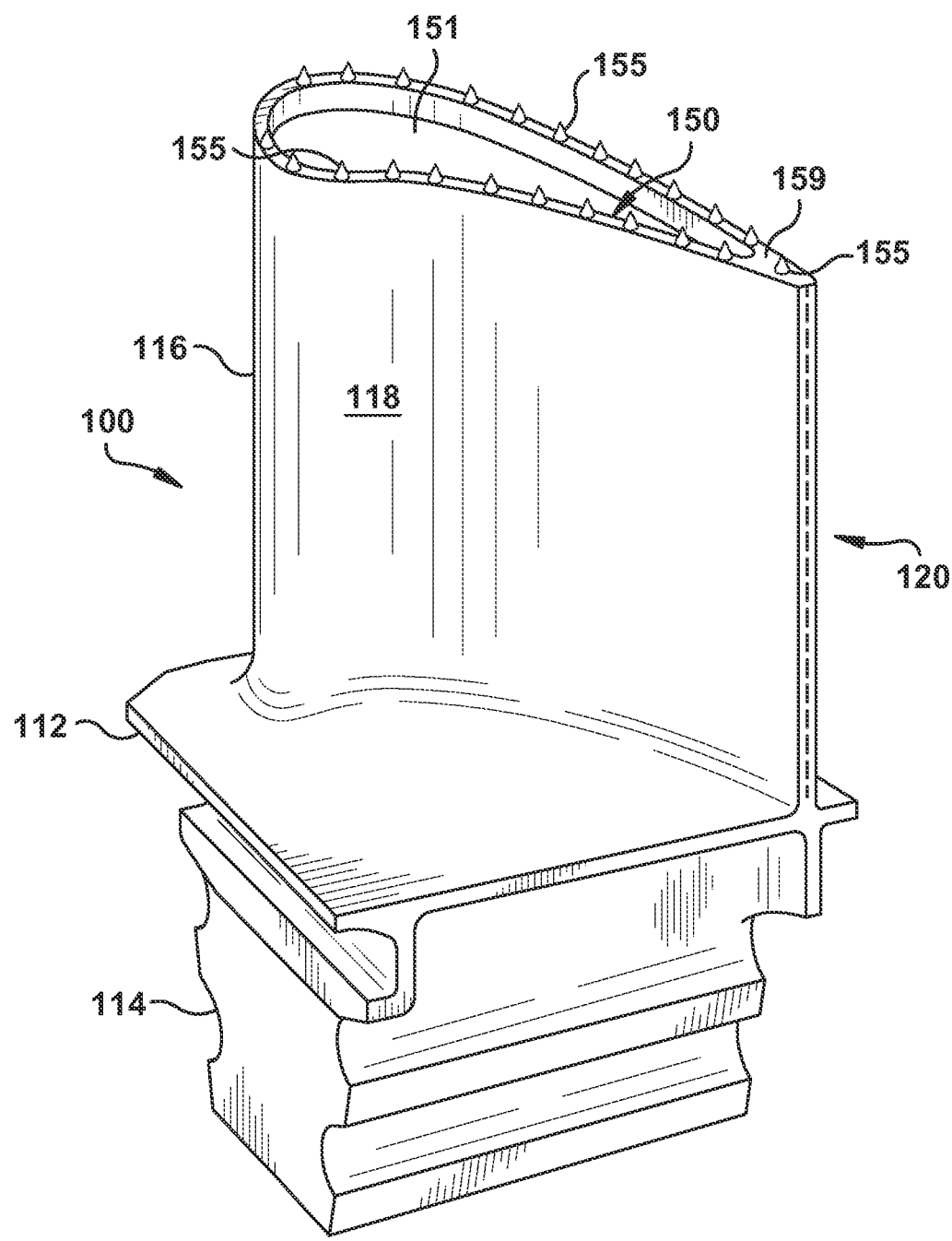
FIG. 2 is a perspective view of a turbine bucket according to one or more embodiments shown or described herein.

Referring now to FIG. 2, a turbine bucket 100 from the turbine 16 of the gas turbine system 10 is illustrated within the scope of the present disclosure. The turbine bucket 100 as disclosed herein can comprise any stage turbine bucket 100.

The turbine bucket 100 may comprise a platform 112 which attaches to the rotor (not shown) through any suitable connection, such as a dovetail 114 configuration as illustrated in FIG. 2. The external surface of the turbine bucket 100 has an airfoil 116 shape, with a pressure side 118 and a suction side 120, to facilitate the flow of combustion gasses over the surface. In some embodiments, the turbine bucket 100 may be hollow to allow for the internal flow of cooling air within the turbine bucket 100 to reduce the surface temperature of the turbine bucket. Furthermore, the turbine bucket 100 may comprise any suitable material for a hot gas path application in a gas turbine system 10 such as being cast using precipitation hardened superalloys including, but not limited to, Renè N5, GTD-111® and the like.

The turbine bucket 100 may further comprise a bucket squealer tip 150 attached to the pressure side 118 and the suction side 120 on top of the turbine bucket 100. The bucket squealer tip 150 may be made from any suitable material such as a same or similar precipitation hardened material as used for the turbine bucket 100. For example, a precipitation hardened material may include at least about 15% by volume of precipitant, or even at least about 20% by volume of precipitant. Examples of precipitation hardened materials within the scope of the present disclosure include, but are not limited to, high gamma prime nickel base materials, Renè N5, Renè N4, Renè 108, Renè 142, GTD-111®, GTD-444®, and Inconel 738. Such precipitation hardened materials may provide increased strength over the operating temperatures of the turbine 16. As a result, the bucket squealer tip 150 may be less susceptible to swelling and creep, thereby potentially increasing the intervals between maintenance and inspection cycles. However, while specific examples of turbine buckets 100 and bucket squealer tips 150 have been presented herein, it should be appreciated that such elements may additionally or alternatively comprise any other material or materials suitable for operation the gas turbine system 10 including, for example, solid solution strengthened materials.

In some embodiments, the top of the turbine bucket 100 may further comprise a recess 151 in which the bucket squealer tip 150 fits. The bucket squealer tip 150 may provide additional support between the pressure side 118 and the suction side 120 of the turbine bucket 100 to further maintain the shape of the airfoil 116.

Figure 3:
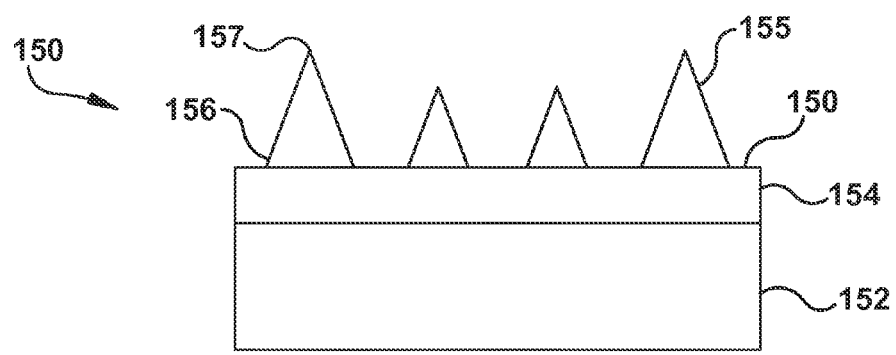
FIG. 3 is a partial cross-sectional view of a bucket squealer tip of a turbine bucket according to one or more embodiments shown or described herein.

Referring now to FIGS. 2 and 3, the bucket squealer tip 150 further comprises a plurality of high hot hardness shroud-cutting deposits 155 deposited on an exterior surface 159 of the bucket squealer tip 150. The plurality of high hot hardness shroud-cutting deposits 155 can facilitate forming a close seal with an abradable shroud without experiencing premature wear as may occur with other, less hard, bucket tips.

To facilitate the creation of a seal with a shroud surface, the high hot hardness shroud-cutting deposits 155 will have a sufficient hardness at elevated temperatures to sufficiently interact with the shroud surface without being prematurely worn away (e.g., less than 200 or even 100 operating hours) in the turbine 16 operating environment. For example, the high hot hardness shroud-cutting deposits 155 can have a hardness of at least about 1100 kg mm$^{-2}$ and a melting temperature of at least about 1500° C. In some embodiments, the high hot hardness shroud-cutting deposits 155 may even have a hardness of at least about 2000 kg mm$^{-2}$ or even at least about 2500 at least about 2000 kg mm$^{-2}$ In some embodiments, the high hot hardness shroud-cutting deposits 155 may even have a melting temperature of at least about 2000, or even at least about 2500° C.

Furthermore, depending on the specific operating conditions of the turbine 16 for which the turbine bucket 100 is to be deployed, the high hot hardness shroud-cutting deposits 155 can have an oxidation resistance that withstands the operating conditions of its environment. For example, similar to the hardness at elevated temperatures discussed above, the high hot hardness shroud-cutting deposits 155 can also be resistant to oxidation such that it is not prematurely away (e.g., less than 200 or even 100 operating hours) in the turbine 16 operating environment.

The high hot hardness shroud-cutting deposits 155 may comprise any material or materials suitable to satisfy the hardness and (and potentially oxidation resistance) at elevated temperatures as discussed above. Such materials may be selected based on deposition technique, compatibility with neighboring materials, desired physical characteristics (e.g., hardness, oxidation resistance) at particular locations, machinability or any other relevant consideration. In some embodiments, one or more of the high hot hardness shroud-cutting deposits 155 may comprise one or more alloys. For example, in some embodiments, the high hot hardness shroud-cutting deposits 155 may be comprise a cobalt-chromium-molybdenum alloy such as Tribaloy alloy T-800 which consists of about 50% hard intermetallic Laves phase dispersed in a softer cobalt alloy matrix. In other embodiments, the high hot hardness shroud-cutting deposits may comprise at least one of CrN, $Cr_3C_2$, HfN, HfC, WC, $Al_2O_3$, SiC, BN, $B_4C$, diamond carbon, or combinations thereof. For example, in some particular embodiments, the high hot hardness shroud cutting deposits 155 may comprise both cubic born nitride (CBN) and alumina ($Al_2O_3$) at a ration from about 50:50 to about 20:80.

In other embodiments, one or more of the high hot hardness shroud-cutting deposits 155 may comprise a combination of hard particles mixed with braze filler metals. The hard particles can provide the necessary cutting and hardness characteristics as discussed above while the braze filler metals may facilitate brazing via lower temperature melting properties with respect to the hard particles. In such embodiments, the hard particles may include, for example, particles that have a hardness of at least about 1100 kg mm$^{-2}$ and a melting temperature of at least about 1500° C. In some embodiments, the hard particles may have a hardness of at least about 2000 kg mm$^{-2}$ or even at least about 2500 at least about 2000 kg mm$^{-2}$ For example.

Figure 4:
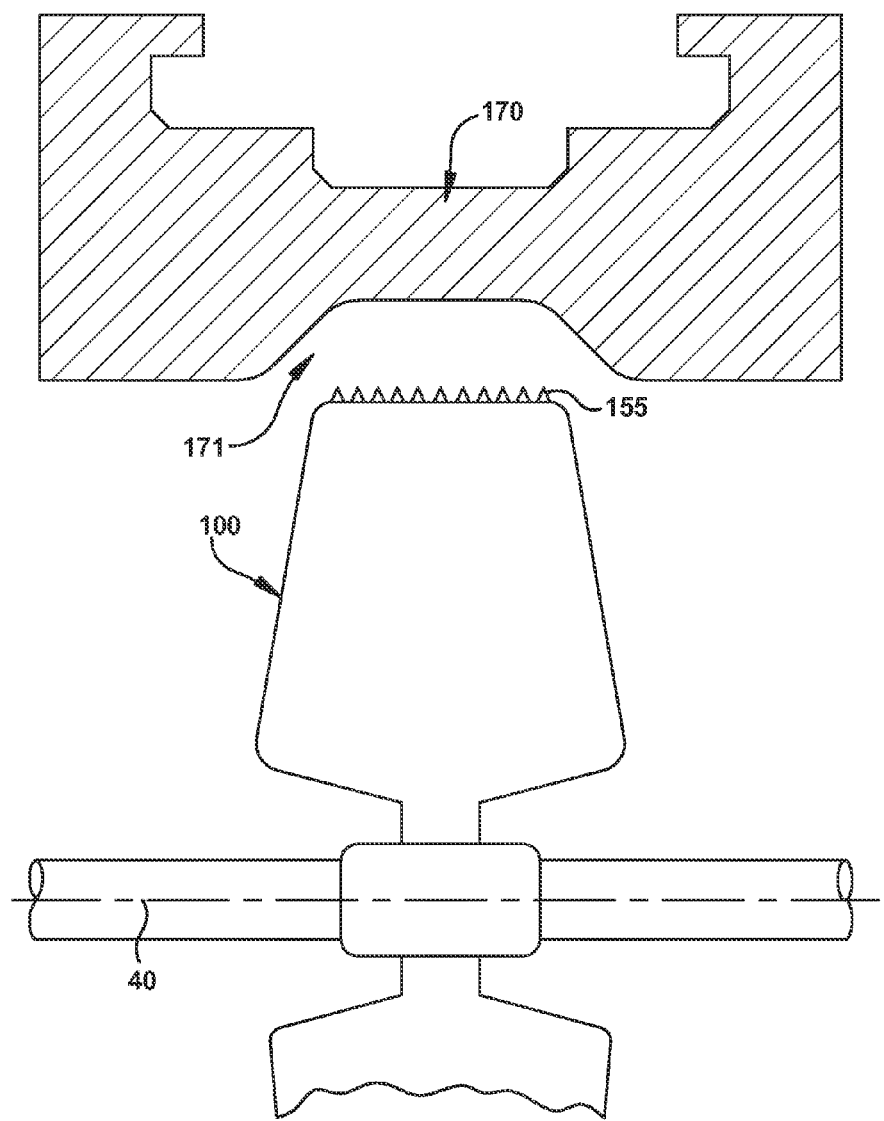
FIG. 4 is an partially exploded illustration of a portion of a turbine stage including a turbine bucket and shroud assembly according to one or more embodiments shown or described herein; and, FIG. 5 illustrates a method for modifying a turbine bucket according to one or more embodiments shown or described herein.

The high hot hardness shroud-cutting deposits 155 may comprise a variety of shapes for facilitating the seal creation between the bucket squealer tip 150 and the shroud surface. For example, in some embodiments, the high hot hardness shroud-cutting deposits 155 can comprise a tapered point 156 distal the exterior surface 159 such as illustrated in FIGS. 2-4. In other embodiments, the high hot hardness shroud-cutting deposits 155 may comprise a semi-spherical bump, a flat surface or the like. Moreover, the high hot hardness shroud-cutting deposits 155 may comprise a series of individually shaped deposits, a series of ridges that extend for an elongated distance or combinations thereof.

Likewise, the high hot hardness shroud-cutting deposits 155 may be deposited in a variety of locations of the exterior surface 159 of the bucket squealer tip 150. For example, the high hot hardness shroud-cutting deposits 155 may be placed around the circumference of the bucket squealer tip 150 (as illustrated in FIG. 2) in a uniform or non-uniform distribution. Alternatively or additionally, high hot hardness shroud-cutting deposits 155 may be placed at a higher concentrations (i.e., with a higher density) at some locations compared to others. For example, high hot hardness shroud-cutting deposits 155 may be placed exclusively or at a higher rate in one portion of the bucket squealer tip 150 (e.g., proximate the suction side 120) than another portion of the bucket squealer tip 150 (e.g., proximate the pressure side 118).

Still referring to FIGS. 2 and 3, the high hot hardness shroud-cutting deposits 155 may each consist of the same material or materials and/or shapes such that each of the high hot hardness shroud-cutting deposits 155 has substantially the same physical characteristics (e.g., hardness, oxidation resistance, cutting prowess, etc.).

Alternatively, in some embodiments, the high hot hardness shroud-cutting deposits 155 may comprise different materials and/or shapes such that at least a first high hot hardness shroud-cutting deposit 155 comprises a first composition and/or shape while at least a second high hot hardness shroud-cutting deposit 155 comprises a second composition and/or shape. The first and second compositions/shapes can facilitate different high hot hardness shroud-cutting deposits 155 having different characteristics for creating a seal with a shroud surface. Such embodiments may facilitate some high hot hardness shroud-cutting deposits 155 wearing away sooner than others, or may even facilitate uniform wear for the high hot hardness shroud-cutting deposits 155 based on the fact that some of the high hot hardness shroud-cutting deposits 155 experience harsher conditions than others.

For example, if the suction side 120 of the bucket squealer tip 150 leads in the rotation against the shroud surface with respect to the bucket squealer tip's pressure side 118, the high hot hardness shroud-cutting deposits 155 more proximate the suction side 120 may comprise harder or softer materials depending on whether those high hot hardness shroud-cutting deposits 155 should be more or less wear resistant than those more proximate the pressure side 118. Alternatively or additionally, some high hot hardness shroud-cutting deposits 155 may be larger and/or taller in size with respect to others such as the configuration illustrated in FIG. 3. The larger high hot hardness shroud-cutting deposits 155 may thereby facilitate a first phase of wear against the shroud surface until they themselves are worn to the point that the smaller high hot hardness shroud-cutting deposits 155 assist in the sealing against the shroud surface.

Such embodiments of varied compositions and/or shapes with respect to two or more high hot hardness shroud-cutting deposits 155 may also be utilized to facilitate selective abrasion of the shroud surface as should be appreciated herein. For example, at least a first high hot hardness shroud-cutting deposit 155 may be structured to conduct a first wear phase against the shroud surface while at least a second high hot hardness shroud-cutting deposit 155 may be structured to conduct a second wear phase against the shroud surface after the first wear phase as discussed above. These phases may be used to fine tune the seal creation between the bucket squealer tip and the shroud surface by selectively varying properties within and between the high hot hardness shroud-cutting deposits 155.

The high hot hardness shroud-cutting deposits 155 may be deposited on the bucket squealer tip 150 using a variety of techniques depending on the composition of material(s). For example, in some embodiments, the high hot hardness shroud-cutting deposits 155 may be deposited via welding such as tungsten inert gas (TIG) welding, resistance welding or even electron beam welding. In some embodiments, the high hot hardness shroud-cutting deposits 155 may be deposited with the assistance of one or more lasers such as pulsed laser welding. Such pulsed laser welding embodiments can facilitate the deposition of high hot hardness shroud-cutting deposits 155 with less distress (e.g., from increased heat due to welding) on the bucket squealer tip 150. In other embodiments, the high hot hardness shroud-cutting deposits 155 may be deposited via additive manufacturing such as selective laser melting (SLM), selective laser sintering (SLS), direct metal laser sintering (DMLS) or the like.

With specific reference to FIG. 3, in some embodiments the high hot hardness shroud-cutting deposits 155 may be deposited on top of a coating 154 that forms the exterior surface 159 of the bucket squealer tip 150. The coating 154 may cover all or part of the underlying alloy 152 of the bucket squealer tip 150 to provide corrosion, erosion or other protection. For example, the coating 154 can comprise a thermal barrier coating (e.g., a bond coat and a thermal barrier coat). In some embodiments, the thermal barrier coating can comprise a patterned thermal barrier coating that the high hot hardness shroud-cutting deposits 155 can be selectively deposited thereon. The patterned thermal barrier coating and the high hot hardness shroud-cutting deposits 155 can combine to facilitate cutting of a shroud surface to form a seal there between.

Referring now to FIG. 4, a turbine bucket 100 with a bucket squealer tip 150 comprising a plurality of high hot hardness shroud-cutting deposits 155 as disclosed herein is illustrated in an exploded schematic with respect to a shroud assembly 170. The turbine bucket 100 rotates about an axis 40 on being subjected to the hot gas flow from the combustor (illustrated as 14 in FIG. 1). The shroud assembly 170 surrounds the turbine bucket 100 and is substantially concentric with the axis 40. The shroud surface 171 comprising an abradable material may become partially removed (as illustrated) due to the rotation of the turbine bucket 100 to form a seal there between.

Specifically, as the turbine bucket 100 rotates during turbine 16 operation, the high hot hardness shroud-cutting deposits 155 rub against the shroud surface 171 of the shroud assembly 170. The high hot hardness shroud-cutting deposits 155 subsequently wear down the shroud surface to form a tight seal between the bucket squealer tip 150 and the shroud assembly 170. The high hot hardness shroud-cutting deposits 155 can have the physical characteristics to withstand the operating environment for at least 100 hours, or even 200 hours, before they themselves are degraded from various factors. By providing such supplemental features on the bucket squealer tip 150, a tight seal may be more consistently facilitated without subjecting the turbine bucket 100 to unnecessary distress.

It should be appreciated that the turbine bucket 100 comprising the bucket squealer tip with high hot hardness shroud-cutting deposits 155 disclosed herein can comprise any stage turbine bucket 100. Furthermore, the general profile, orientation, and size of the turbine bucket 100 illustrated in FIGS. 2 and 4 are exemplary only and not intended to be limiting. It should be appreciated that variations of thereof may additionally and/or alternatively be utilized with the high hot hardness shroud-cutting deposits 155 disclosed herein.

Figure 5:
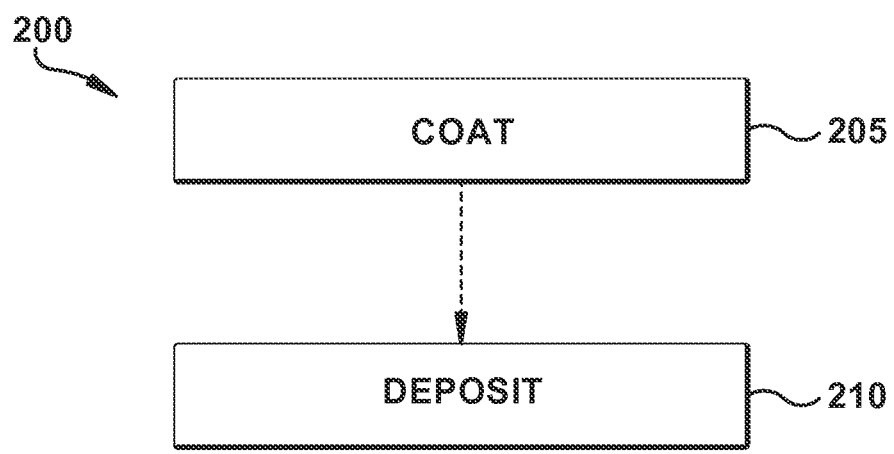

Referring additionally to FIG. 5, a method 200 is illustrated for modifying a turbine bucket 100 as disclosed herein. As discussed above, the turbine bucket 100 can have a pressure side 118 opposite a suction side 120 and a bucket squealer tip 150 attached to the pressure side 119 and the suction side 120. The method 200 generally comprise depositing a plurality of high hot hardness shroud-cutting deposits 155 on the exterior surface 159 of the bucket squealer tip 150 in step 210. As also discussed above, the high hot hardness shroud-cutting deposits 155 deposited in step 210 have a hardness of at least about 1100 kg mm$^{-2}$ and a melting temperature of at least about 1500° C. The high hot hardness shroud-cutting deposits 155 can be comprise any shape and composition and using any suitable technique as discussed herein.

In some specific embodiments, the method 200 may optionally comprise coating the bucket squealer tip 150 with a thermal barrier coating in step 205. In such embodiments, the coating step 205 may occur before depositing the high hot hardness shroud-cutting deposits 155 on the exterior surface 159 in step 210. The high hot hardness shroud-cutting deposits 155 may thereby be deposited on top of the thermal barrier coating and using such deposition techniques such as pulsed laser welding to sufficiently deposit the high hot hardness shroud-cutting deposits 155 without subjecting the bucket squealer tip 150 (or the coating 154) to undue distress.

It should now be appreciated that high hot hardness shroud-cutting deposits can be deposited on the exterior surfaces of bucket squealer tips to facilitate the seal creation between a turbine bucket and shroud assembly. The high hot hardness shroud-cutting deposits can possess sufficient hardness (and oxidation) characteristics to survive at least 100 hours in the turbine operating environment while cutting away at the shroud surface during the rotational movement. Deposition techniques may be selected to deposit the high hot hardness shroud-cutting deposits on top of any coatings on the bucket squealer tip without subjecting the part to undue distress. Moreover, the high hot hardness shroud-cutting deposits can be tailored via their compositions, shapes, sizes and placements to tailor the sealing process based on the predicted their predicted wear patterns.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A turbine bucket comprising:
   a pressure side;
   a suction side opposite the pressure side; and,
   a bucket squealer tip attached to the pressure side and the suction side comprising a plurality of high hot hardness shroud-cutting deposits deposited on an exterior surface of the bucket squealer tip, wherein the plurality of high hot hardness shroud-cutting deposits have a hardness of at least about 1100 kg mm$^{-2}$ and a melting temperature of at least about 1500° C., wherein the plurality of high hot hardness shroud-cutting deposits are selected from the group consisting of CrN, $Cr_3C_2$, HfN, HfC, WC, $Al_2O_3$, SiC, BN, $B_4C$ and diamond carbon, and, wherein at least a first high hot hardness shroud cutting deposit comprises a first composition and at least a second high hot hardness shroud cutting deposit comprises a second composition different than the first composition, wherein the high hot hardness shroud-cutting deposits comprise a plurality of hard particles mixed with one or more braze filler metals wherein the plurality of hard particles deposits comprise both cubic boron nitride (CBN) and alumina ($Al_2O_3$) at a ratio from about 50:50 to about 20:80.

2. The turbine bucket of claim 1, wherein the high hot hardness shroud-cutting deposits comprise a cobalt-chromium-molybdenum alloy.

3. The turbine bucket of claim 1, wherein the plurality of high hot hardness shroud-cutting deposits have a hardness of at least about 2000 kg mm$^{-2}$ and a melting temperature of at least about 2000° C.

4. The turbine bucket of claim 1, wherein the exterior surface of the bucket squealer tip comprises a thermal barrier coating.

5. The turbine bucket of claim 4, wherein the thermal barrier coating is a patterned thermal barrier coating.

6. The turbine bucket of claim 1, wherein at least one of the high hot hardness shroud-cutting deposits comprises a tapered point distal the exterior surface.

7. The turbine bucket of claim 1, wherein at least a first high hot hardness shroud cutting deposit comprises a first shape and at least a second high hot hardness shroud cutting deposit comprises a second shape different than the first shape.

8. A method for modifying a turbine bucket having a pressure side opposite a suction side and a bucket squealer tip attached to the pressure side and the suction side, the method comprising:
   depositing a plurality of high hot hardness shroud-cutting deposits on an exterior surface of the bucket squealer tip, wherein the plurality of high hot hardness shroud-cutting deposits have a hardness of at least about 1100 kg mm$^{-2}$ and a melting temperature of at least about 1500° C., wherein at least a first high hot hardness shroud cutting deposit comprises a first composition and at least a second high hot hardness shroud cutting deposit comprises a second composition different than the first composition, and, wherein the high hot hardness shroud-cutting deposits comprise a plurality of hard particles mixed with one or more braze filler metals, and wherein the plurality of hard particles are selected from the group consisting of CrN, $Cr_3C_2$, HfN, HfC, WC, $Al_2O_3$, SiC, BN, $B_4C$ and diamond carbon, wherein the plurality of hard particles deposits comprise both cubic boron nitride (CBN) and alumina ($Al_2O_3$) at a ratio from about 50:50 to about 20:80.

9. The method of claim 8, wherein the plurality of high hot hardness shroud-cutting deposits are deposited via pulsed laser welding.

10. The method of claim 8 further comprising coating the bucket squealer tip with a thermal barrier coating before depositing the plurality of high hot hardness shroud-cutting deposits on the exterior surface.

11. The method of claim 8, wherein the plurality of high hot hardness shroud-cutting deposits have a hardness of at least about 2000 kg mm$^{-2}$ and a melting temperature of at least about 2000° C.

12. The method of claim 8, wherein at least a first high hot hardness shroud cutting deposit is deposited in a first shape and at least a second high hot hardness shroud cutting deposit is deposited in a second shape different than the first shape.

13. The method of claim 8, wherein at least one of the high hot hardness shroud-cutting deposits comprises a tapered point distal the exterior surface.

14. The method of claim 8, wherein the high hot hardness shroud-cutting deposits comprise a cobalt-chromium-molybdenum alloy.

15. A method for modifying a turbine bucket having a pressure side opposite a suction side and a bucket squealer tip attached to the pressure side and the suction side, the method comprising:

depositing a plurality of high hot hardness shroud-cutting deposits on an exterior surface of the bucket squealer tip, wherein the plurality of high hot hardness shroud-cutting deposits have a hardness of at least about 1100 kg mm$^{-2}$ and a melting temperature of at least about 1500° C., wherein at least a first high hot hardness shroud cutting deposit comprises a first composition and at least a second high hot hardness shroud cutting deposit comprises a second composition different than the first composition, and, wherein the high hot hardness shroud-cutting deposits comprise a plurality of hard particles mixed with one or more braze filler metals, and wherein the plurality of hard particles are selected from the group consisting of CrN, $Cr_3C_2$, HfN, HfC, WC, $Al_2O_3$, SiC, BN, $B_4C$ and diamond carbon wherein the plurality of high hot hardness shroud-cutting deposits comprise both cubic born nitride (CBN) and alumina ($Al_2O_3$) at a ratio from about 50:50 to about 20:80.

* * * * *